United States Patent
Im et al.

(10) Patent No.: US 9,234,454 B2
(45) Date of Patent: Jan. 12, 2016

(54) ADIABATIC COMPRESSED AIR ENERGY STORAGE FOR AUTOMOTIVE VEHICLE AND ENERGY STORAGE METHOD USING THE SAME

(71) Applicant: KOREA INSTITUTE OF ENERGY RESEARCH, Daejeon (KR)

(72) Inventors: Yong Hoon Im, Daejeon (KR); Byung Sik Park, Daejeon (KR); Dae Hun Chung, Seoul (KR); Sae Byul Kang, Daejeon (KR); Jae Yong Lee, Seoul (KR); Dong Hyun Lee, Seoul (KR); Kyu Sung Choi, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 223 days.

(21) Appl. No.: 13/963,370

(22) Filed: Aug. 9, 2013

(65) Prior Publication Data

US 2014/0053552 A1  Feb. 27, 2014

(30) Foreign Application Priority Data

Aug. 24, 2012  (KR) .................. 10-2012-0092683

(51) Int. Cl.
*F02B 37/00* (2006.01)
*F01K 3/10* (2006.01)
*F01K 15/02* (2006.01)
*F22B 1/02* (2006.01)

(52) U.S. Cl.
CPC . *F02B 37/00* (2013.01); *F01K 3/10* (2013.01); *F01K 15/02* (2013.01); *F22B 1/02* (2013.01)

(58) Field of Classification Search
CPC ......... F01K 15/02; F01K 3/185; F01K 3/188; F01K 3/26; F01K 3/262; F01K 23/02; F01K 23/08; F02B 21/00; F02B 37/00; F02B 33/44; F22B 1/028; F01P 5/08
USPC ................. 60/659, 613, 599, 611, 616, 618
See application file for complete search history.

(56) References Cited

U.S. PATENT DOCUMENTS

| | | | | |
|---|---|---|---|---|
| 3,765,180 A | * | 10/1973 | Brown | 60/370 |
| 4,089,176 A | * | 5/1978 | Ashe | 60/650 |
| 4,361,204 A | * | 11/1982 | Earle | 180/302 |
| 4,590,766 A | * | 5/1986 | Striebich | 60/618 |
| 4,774,811 A | * | 10/1988 | Kawamura | 60/608 |

(Continued)

FOREIGN PATENT DOCUMENTS

| | | |
|---|---|---|
| JP | 2001-517751 A | 10/2001 |
| JP | 2003-175721 A | 6/2003 |

(Continued)

*Primary Examiner* — Jorge Pereiro
*Assistant Examiner* — Jason T Newton
(74) *Attorney, Agent, or Firm* — Rabin & Berdo, P.C.

(57) ABSTRACT

Provided are an adiabatic compressed air energy storage for an automotive vehicle and an energy storage method using the same, whereby a new vehicle function is provided by using available energy from the discharged and expelled energy generated from a driven automotive vehicle or available energy source outside an automotive vehicle, and transforming the generated energy to convenient electric power and efficiently storing the energy, so that electric power can be supplied regardless of space or time constraint during the automotive vehicle in operation or parked or vehicle engine stop in view of the increase demands of electric power in automotive vehicles.

9 Claims, 5 Drawing Sheets

(Charging process)

(Discharging process)

(56) References Cited

U.S. PATENT DOCUMENTS

| | | | |
|---|---|---|---|
| 5,191,766 A * | 3/1993 | Vines | 60/619 |
| 5,385,211 A * | 1/1995 | Carroll | 180/65.245 |
| 5,385,214 A * | 1/1995 | Spurgeon | 180/304 |
| 5,549,174 A * | 8/1996 | Reis | 180/165 |
| 5,680,764 A * | 10/1997 | Viteri | 60/716 |
| 6,054,838 A * | 4/2000 | Tsatsis | 320/101 |
| 6,450,283 B1 * | 9/2002 | Taggett | 180/304 |
| 7,134,285 B2 * | 11/2006 | Primlani | 60/784 |
| 7,559,394 B2 * | 7/2009 | Rask et al. | 180/165 |
| 7,921,944 B2 * | 4/2011 | Russell et al. | 180/65.265 |
| 7,926,274 B2 * | 4/2011 | Farkaly | 60/670 |
| 8,499,874 B2 * | 8/2013 | Dewis et al. | 180/165 |
| 8,584,459 B2 * | 11/2013 | Richards | 60/608 |
| 2004/0189008 A1 * | 9/2004 | Tsatsis | 290/1 A |
| 2007/0068712 A1 * | 3/2007 | Carnahan | 180/65.2 |
| 2009/0090109 A1 * | 4/2009 | Mills et al. | 60/659 |
| 2009/0205892 A1 * | 8/2009 | Jensen et al. | 180/165 |
| 2012/0324884 A1 * | 12/2012 | Reuss et al. | 60/613 |
| 2014/0261288 A1 * | 9/2014 | Coney et al. | 123/197.1 |

FOREIGN PATENT DOCUMENTS

| | | |
|---|---|---|
| JP | 2010-501785 A | 1/2010 |
| KR | 20-0262634 Y1 | 3/2002 |

* cited by examiner

FIG. 1

(PRIOR ART)

ADIABATIC COMPRESSED AIR ENERGY STORAGE FOR AUTOMOTIVE VEHICLE AND ENERGY STORAGE METHOD USING THE SAME

BACKGROUND OF THE INVENTION

1. Technical Field

The present invention relates to an adiabatic compressed air energy storage for an automotive vehicle to effectively transform and store available but wasted energy from the automotive vehicle being driven or external energy source into electric power for easy use in the automotive vehicle, and an energy storage method using the same.

2. Discussion of Related Art

The efficiency of energy use in an automotive vehicle being in operation is roughly 30%, and remaining 65~70% is expelled from the vehicle while a little amount of exhaust heat may be used as heat energy.

An electric power car being recently spread is driven by receiving electric power from external source (Plug-in), and a hybrid car generates power by using effective power drawn from shafts depending on operation condition and stores the power into battery.

Recently, we are seeing rapid changes in our life styles developed based on smart technologies. Particularly, electric power demands for various smart mobile devices inside an automotive vehicles running or parked will be dramatically increased. In the conventional or existing automotive vehicle, when its engine is not in operation (off) while being parked or stopped, electric power supply from the automotive vehicle could not be expected because of discharge of battery power. Therefore, it is highly requested for the functions of new automotive vehicles enable to meet the increased demand of electric power supply in automotive vehicles.

SUMMARY OF THE INVENTION

Therefore, the present invention has been made to solve the above problems, and it is an aspect of the present invention to provide an energy storage system for an automotive vehicle by using compressed air to easily increase its electric power storage density unlike the conventional battery storage method of an automotive vehicle and solve the space limitation in increasing its electric power storage capacity due to volume increase in proportion to electric power storage capacity.

To achieve this purpose, solar power generation using PV (photovoltaic) devices being easily installed out of an automotive vehicle and the power generation using high temperature exhaust gas (700~900° C.) from a car engine, particularly power generation system using a turbo charger conventionally used for supercharging of an automotive vehicle can be employed thereby to maximize technology application and business value effects.

Further, in order to increase the storage efficiency of electric power and effectively control and use the heat energy generated during air compression and expansion, adiabatic CAES (compressed air energy storage), which stores and reuses the heat generated during air compression, is employed and improved in association with the operation and driving condition of an automotive vehicle.

Further, the purpose of the present invention is to maximize the technology application utility by employing thermochemical heat storage technology enable to effectively comply with the space constraint condition due to its high heat storage density and relieve the heat loss, which otherwise occurs during energy storage in association with ambient air (later-mentioned as outer air).

According to operation characteristics of engine types, in the compression ignition type Diesel engine which normally uses a supercharger, the power generation can be possible by using high temperature exhaust gas while the modification and changes of engine structure can be minimized by decoupling the section mechanically associated with a compressor for engine supercharging, and connecting to a power generator, thereby to increase the power usage in association with the conventional shaft and in use of expelled heat energy, and enable a user to selectively use the function of the electric power generation provided according to the present invention.

Meanwhile, in the spark ignition type of gasoline engine (SI engine), which does not normally employ a supercharger, this turbocharger based power generation system according to the present invention is installed so as to generate electric power by using exhaust gas. Recently, as same as DI engine, the gasoline direct injection (GDI) engine increasingly employs the use of a supercharging method. In this use, the present invention provides the increase of the conventional use of shaft power and the power generation using discharged heat and selective usage function according to the user's demand and purposes.

Further, by the use of the compressor operated by the power generated from the energy from turbo charger power generation according to the present invention, instead of the power through the shaft usage in a turbo charger for supercharging in the compression ignition type engine normally using a turbo charger, or the gasoline engine using a turbo charger, the present invention provides an adiabatic compressed air energy storage for an automotive vehicle and an energy storage method using the same to solve a turbo lag problem encountered in turbocharged supercharging internal engine, which is short delay in response after the accelerator pedal pressed as well as provide the same effects as the conventional supercharging.

According to an aspect of the invention, there is provided an adiabatic compressed air energy storage for an automotive vehicle comprising: a power generator being connected to a turbine for turbo-charging of an automotive vehicle and generating a first power; an additional compressor being driven by the first power and supplying compressed air; a heat exchanger for cooling the compressed air by heat-exchanging the compressed air with outer air; a storage tank for storing the cooled compressed air; a power generating section being driven by the compressed air in the storage tank and generating a second electric power for use in electric power demand; a heat storage section for storing the heat energy of high temperature outer air discharged from the heat exchanger; and a steam processing section for storing the steam discharged by the reaction of high temperature outer air with a storage material in the heat storage section and supplying the steam when demanded to generate the heat energy of the storage material.

According to another aspect of the invention, there is provided a method of storing energy using an adiabatic compressed air energy storage for automotive vehicle comprising steps of: connecting a power generator to the power of a turbine in an automotive vehicle so as to generate a first power; driving a vehicle compressor by the first power in the case that supercharging is more necessary than energy storage in an automotive vehicle, so as to supply supercharging to an engine; driving an additional compressor by the first power or a third power via PV modules; cooling a compressed air generated in the additional compressor by using outer air; storing the cooled compressed air; storing the heat energy of the outer air used for heat exchange; cooling the steam generated during the storage of the heat energy and storing as condensate water; supplying the steam to the heat storage section when electric power is demanded in and out of the automotive vehicle, so as to generate stored heat energy; supplying condensate water to the heat storage section instead of the steam when the internal temperature of the heat storage section reaches a predetermined set temperature; expanding the compressed air to be supplied as heat energy; and driving the power generating section by the expanded compressed air so as to generate a second power for use in electric power demands.

As described above, according to the present invention, the usage efficiency of the available energy in an automotive vehicle can be greatly improved by effective use of the discharged but expelled heat generated during the operation of an automotive vehicle.

Further, according to the present invention, a turbo lag problem occurred in the turbo charger supercharging based DI engine and GDI type SI engine automotive vehicle can be solved without extra use of the power through shafts or additional electric power consumption. Even though a non-GDI type SI engine does not use a turbo charger, the present invention can be employed to the power generation application using discharge gas.

Further, according to the present invention, the power supply function in an automotive vehicle can be greatly improved by the energy storage of electric power which is easy and convenient for use.

Further, the present invention satisfies the increased demands for electric power of users who are used to enjoying smart devices life style and using smart mobile devices regardless of space or time constraint inside a running automotive vehicle through the turbocharger power generation and available solar energy power generation, and through the storage of the electric power and electric power supply from the stored energy inside or outside a parked or stopped automotive vehicle without the usage of conventional batteries or engine operation.

Further, in view of recent increase of outdoor life style, the present invention provides the electric power supply means for easily and conveniently supplying electric power to various power demands in outdoor or picnic, and in association with hybrid vehicles, the electric power energy stored as compressed air according to the present invention can be supplied to the hybrid vehicle motor, thereby to furnish necessary electric power at the driving mode of an electric vehicle.

Other objects and advantages of the invention will become apparent from embodiments of the invention to be described later. The objects and advantages of the invention can be embodied by means described in the appended claims and combinations thereof.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

Before detailed description of various embodiments of the invention, it should be understood that the invention is not limited to the constitutions and arrangements of elements described in the following description or shown in the drawings. The invention can be embodied as various embodiments and can be put into practice through various methods. Terms indicating directions of apparatuses or elements (such as "front", "back", "up", "down", "top", "bottom", "left", "right", and "lateral") are used to simplify description of the invention and do not represent nor mean that the apparatuses or elements have specific directions. Terms such as "first" and "second" used in this specification or the appended claims are not intended to represent or mean the relative importance or meaning.

The invention has the following features so as to achieve the above-mentioned objects.

Hereinafter, exemplary embodiments of the invention will be described in detail with reference to the accompanying drawings. Terms or words used in the specification and the appended claims should not be analyzed as typical or dictionary definitions but should be analyzed as definitions and concepts suitable for the technical spirit on the basis of the principle that the inventor can appropriately define concepts of terms to explain the invention in the best mode.

Therefore, configurations described in the embodiments of the invention and shown in the drawings are only examples of the invention but do not represent all the technical spirit of the invention. Accordingly, it should be understood that various equivalents and modifications may be present at the time of filing the invention.

Hereinafter, an adiabatic compressed air energy storage for automotive vehicle and an energy storage method using the same according to an embodiment of the present invention will be described in detail in reference to FIGS. 1 to 5.

Figure 2:
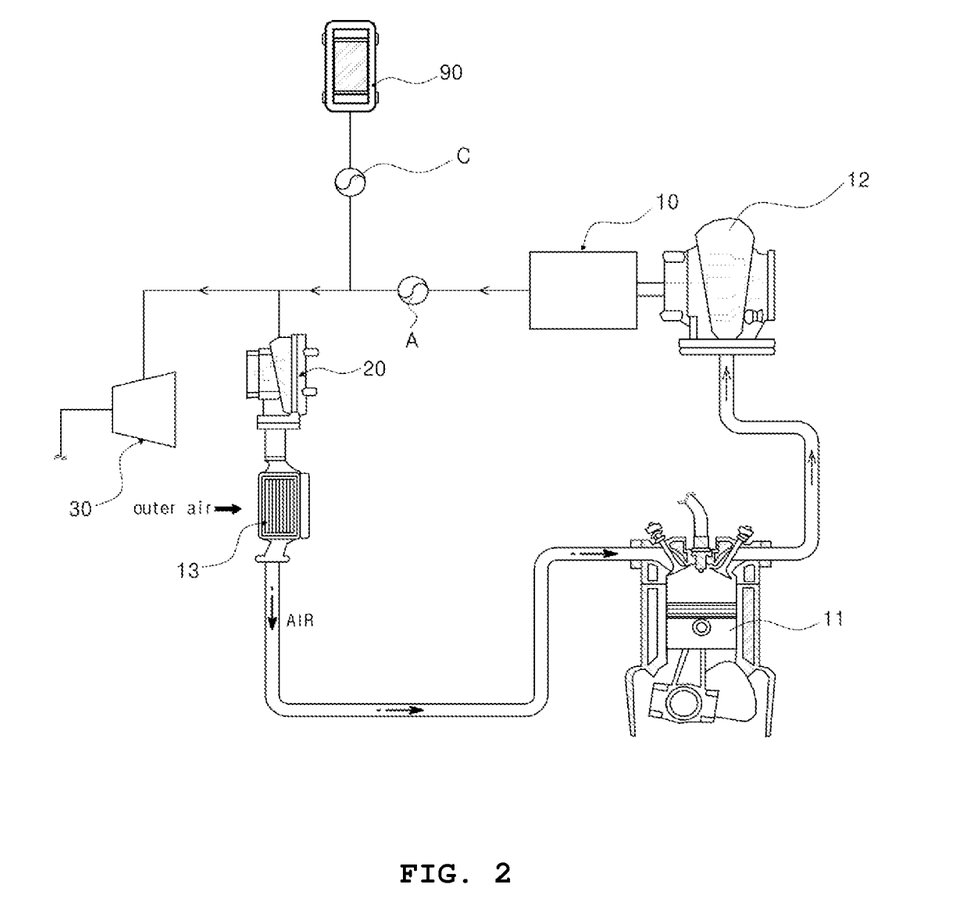
FIG. 2 is a view showing that a power generator is employed to a turbo charger according to an embodiment of the present invention.
Figure 3:
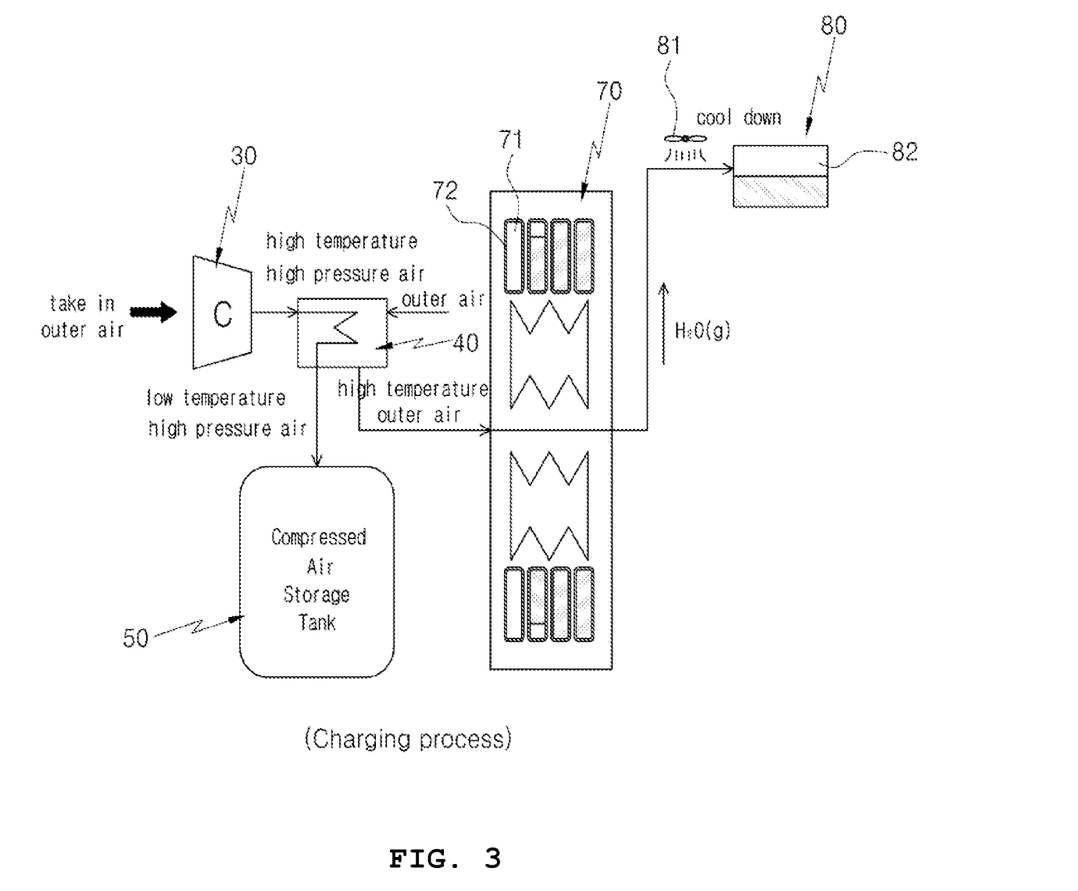
FIG. 3 is a view showing the process of storing compressed air and heat energy (charging process) according to an embodiment of the present invention.
Figure 4:
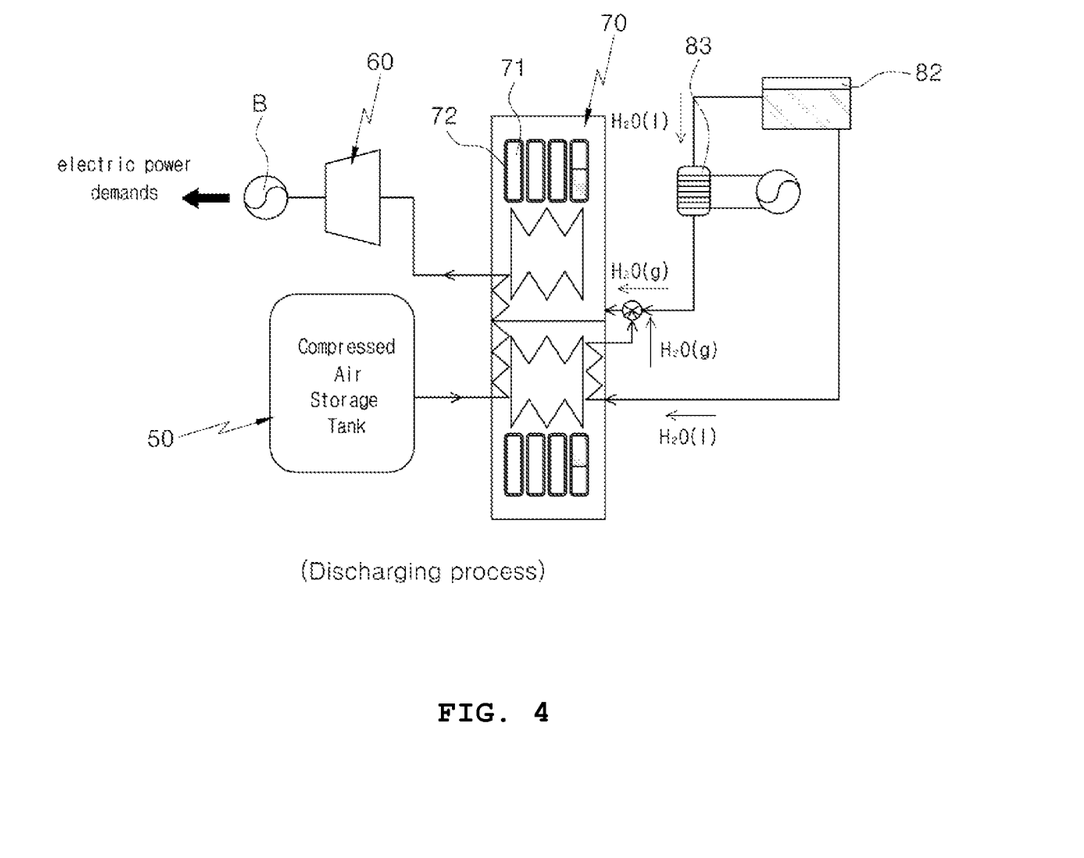
FIG. 4 is a view showing the process of expanding the compressed air by using the stored heat energy and operating electric power generating section (discharging process) according to an embodiment of the present invention.

As illustrated in the drawings, the adiabatic compressed air energy storage for automotive vehicle according to the present invention comprises a power generator 10, a vehicle compressor 20, an additional compressor 30, a heat exchanger 40, a storage tank 50, a power generating section 60, and a heat storage section 70 (thermochemical storage section).

The power generator 10 is connected to a turbo charger of an automotive vehicle via a power transfer means such as axis, etc. so as to generate first power A, and an electric generator may be used.

Figure 1:
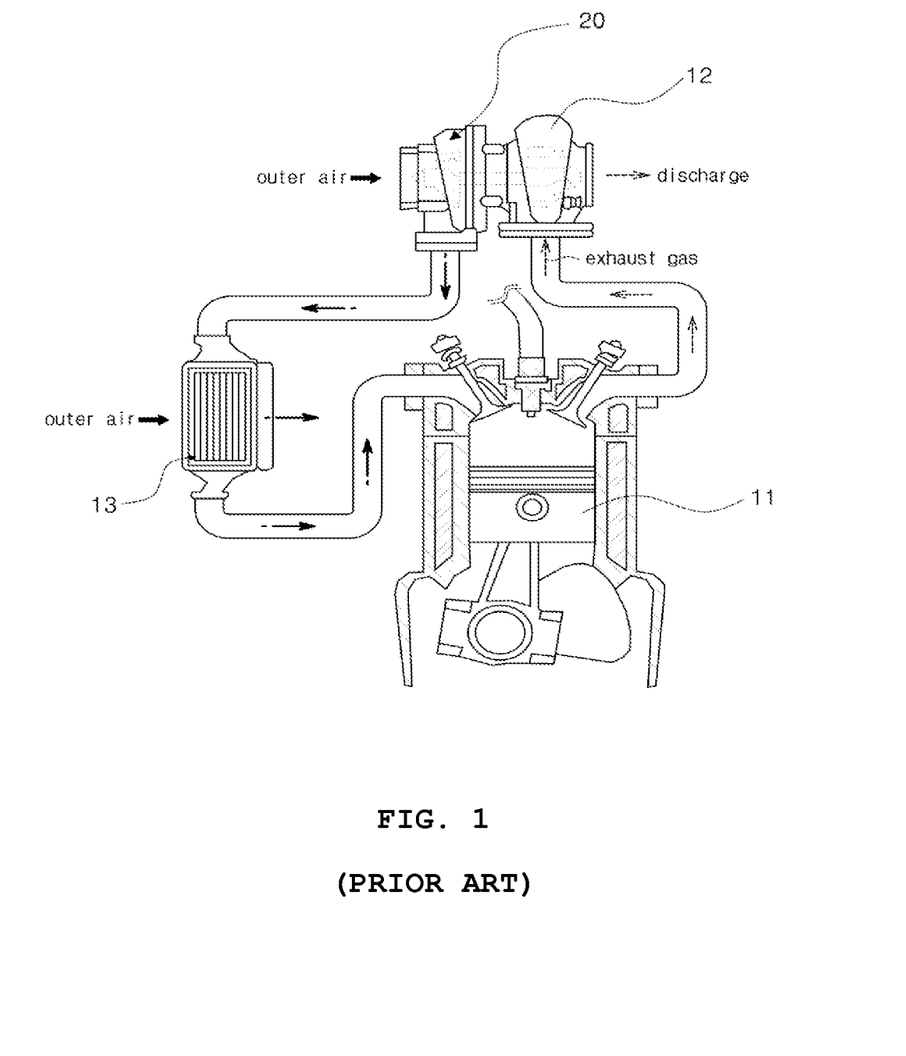
FIG. 1 is a view showing the configuration of a conventional turbo charger.

For the power source to forcibly pressurize and increase the density of the air introduced into the cylinder of an engine 11, the turbo charger is operated by using high temperature combustion exhaust gas and generated axial power is connected to the vehicle compressor so that the compressed air is supplied to the engine 11 (intake side), and is located under an exhaust manifold.

In more detail, the exhaust gas, which is emitted out of an automotive vehicle after explosion inside the engine cylinder, is also introduced into a turbine 12. With the pressure of the exhaust gas introduced into the turbine, a turbine wheel inside the turbine 12 is rotated.

A compressor wheel inside the vehicle compressor 20 being located in opposite to the turbine wheel and being connected each other in power transferable is also rotated with the rotation of the turbine wheel. With the rotation of the compressor wheel, the air out of the compressor is taken in, and is cooled down via cooling section 13 such as intercooler, etc. and is forcibly supplied into the cylinder of the engine 11 (supercharging).

Among the power generating systems using a turbo charger for automotive vehicles, the present invention provides a power generating system in which after decoupling the vehicle compressor 20 and the turbo charger mechanically and in power-transferable connected via axis for supercharging of the engine 11, the power generator 10 is connected to the vehicle compressor 20, the turbine axis of the turbo charger is rotated by the exhaust gas produced from the engine 11 and the power generator 10 is operated so as to generate a first power A.

As described above, the vehicle compressor 20 is a compressor, which was connected to the turbine 12 via axis, in order to use the turbo charger.

The function of the vehicle compressor 20 is to supercharge the engine 11 as described above. In the present invention, the vehicle compressor 20 is not directly connected to the turbine 12, and is configured as compressor to be driven by electric power, which is the first power A generated from the power generator 10.

According to the present invention, the vehicle compressor 20 is driven by the first power A and its function is to supercharge the engine 11. That is, the vehicle compressor 20 used for supercharging of the engine 11 is not driven by the rotation power of the turbine 12, but is driven by receiving the first power A from the power generator 10 being driven by the rotation power of the turbine 12, or the power from other generating means such as a third power C.

In addition to the vehicle compressor 20 used for supercharging of the engine 11, the additional compressor 30 is provided inside a vehicle. The first power A of the power generator 10 which is used to drive the vehicle compressor 20 is also used to drive the additional compressor 30.

Further, according to the present invention, a plurality of photovoltaic modules (PV module) 90 for generating solar energy are installed on the outer surface of a vehicle so as to generate a third power C. Even while a vehicle is not being driven, that is, when the engine 11 is stopped and exhaust gas is not supplied to the turbine 12, the additional compressor 30 can be driven by the third power C. The PV modules are electrically connected to the additional compressor 30.

As described above, the additional compressor 30 is driven by the first power A or the third power C to intake and press outer air and produce compressed air of high temperature and high pressure.

The heat exchanger 40 is provided to be connected to the additional compressor 30, and functions to cool down the compressed air, which is compressed via the additional compressor 30 and have high temperature and high pressure.

That is, the heat exchanger 40 turns the compressed air with high temperature and high pressure to the compressed air with low temperature and high pressure by heat-exchanging the high temperature and high pressure compressed air with outer air. The outer air, which is increased in its temperature by the heat exchange with the high temperature and high pressure compressed air, is moved to the heat storage section 70 to be described later.

The storage tank 50 stores the low temperature and high pressure compressed air, which has lower temperature by the heat exchange while passing the heat exchanger 40 than when discharged out of the additional compressor 30.

The compressed air with high pressure stored in the storage tank 50 will be used to operate the power generating section 60, which will be described later, when power supply is demanded by a user or various power demands.

The heat storage section 70 is connected to the aforementioned heat exchanger 40 and the later-described storage tank 50, and is composed of a plurality of heat storage units 71 having a storage material 72 in solid state to enable store heat energy therein and generate heat energy. The example of the storage material 72 may be $MgSO_4 \cdot 7\ H_2O$ (Magnesium Sulfate).

The heat storage section 70 takes in the high temperature outer air which is increased in its temperature by the heat exchange with the high temperature and high pressure compressed air in the heat exchanger 40. The high temperature outer air, which is introduced into the heat storage section 70, reacts with the storage material 72 placed inside the plurality of heat storage units 71, so that the storage material 72 stores the heat energy of the high temperature outer air, and decouples moisture (water) adsorbed in the storage material 72. Therefore, only MgSO4 (s) in the solid state inside the storage material 72 is remained in each of the heat storage units 71, and the moisture element is discharged as vapor ($MgSO_4 \cdot 7H_2O$ (s, solid)+Heat=>MgSO4 (s)+7 H2O (g, gas), Charging Process).

That is, by the reaction of the storage material 72 and the introduced high temperature outer air, the dehydration of the storage material is occurred to remove the water element from the storage material 72 and produces the storage material 72 having latent heat, which is enable to generate heat, and steam.

The generated steam as result of the dehydration process from the heat storage section 70 (or the plurality of the heat storage units 71) is moved to a steam processing section 80 via a separate discharge pipe.

Further, a sensor is installed in each of the heat storage units 71 of the heat storage section 70 so that a user can monitor the heat storage state in the heat storage section 70 outside by using the sensors. The sensor may be a temperature sensor for detecting the temperature inside the heat storage units, or various kinds of sensors may be employed. Further, each case of the heat storage units 71 is figured to see through inside so that a user can monitor outside weather the storage material 72 is separated into water and the heat storage material storing heat or not, and which state the storage material 72 is in among solid state, liquid state, and gas state.

The low temperature high pressure compressed air stored in the storage tank 50 is supplied to the power generating section 60 to be described below when power for use is demanded in a vehicle. At this time, the compressed air stored in the storage tank 50 needs expanding for use. To facilitate the expansion of the compressed air, the heat for reaction is required at first, and the heat for reaction is supplied from the heat energy (exothermic energy) stored in the storage material 72 described as above.

In detail, through a steam processing section 80 to be described later, steam is supplied into the heat storage section 70 having the storage material 72 therein in the state of potentially supplying heat, that is, to the storage material 72 inside the plurality of heat storage units 71 of the heat storage section 70, so that the storage material 72 reacts with the steam so as to generate the heat (exothermic energy) stored in the storage material 72 (MgSO4 (s)+7 H2O (g)=>MgSO4.7

H2O+Heat, Discharging Process). The heat is used for the expansion of the compressed air discharged from the storage tank 50. The low temperature high pressure compressed air discharged from the storage tank 50 is expanded by using the energy of the heat and supplied to the power generating section 60.

The steam processing section 80 functions to receive the steam generated from the heat storage section 70 and store in the condensate water state, or change the stored condensate water into the steam state and supply the steam to the heat storage section 70.

The steam processing section 80 comprises a condensation unit 81 to cool down the steam generated from the heat storage section 70 and change the steam into condensate water state, and a condensate water tank 82 to store the condensate water condensed in the condensation unit 81. A cooling fan may be used for the condensation unit 81.

Further, the steam processing section 80 comprises a heating unit 83 operated by using a separate electricity power source. The condensate water in the liquid state in the condensate water tank 82 is heated by using the heating unit 83 so as to be supplied again to the heat storage section 70 in the steam state, when the heat energy stored in the storage material 72 of the heat storage section 70 is requested to generate, that is, when it is necessary to expand the compressed air stored in the storage tank 50 to supply to the heat generating section 60.

Further, to supply the steam to react with the storage material 72 from the steam processing section 80 to the heat storage section 70 in order to use the heat energy of the storage material 72 in the heat storage section 70, the condensate water stored in the condensate water tank 82 is heated by using the heating unit 83, and supplied as steam. The steam is set to be supplied until the heat generating of the storage material 72 in the heat storage units 71 reaches a predetermined level. When a predetermined time for supplying steam is passed or sufficient heat energy (reaction heat) is generated so that the internal temperature of the heat storage section 70 comes to a predetermined set temperature, the heating unit 83 for heating the condensate water in the condensate water tank 82 to generate steam is turned off. Steam is continuously produced by the heat energy generated inside the heat storage section 70, and the low temperature high pressure air, which is to move from the storage tank 50 to the power generating section 60, is expanded by the heat energy generated from the heat storage section 70 before moved to the power generating section 60. Thus, continuous air expansion can be occurred in the low temperature high pressure air moved from the storage tank 50.

As described above, the power generating section 60 is where the high temperature high pressure air expanded by the heat energy generated the heat storage section 70 by using the steam supplied from the steam processing section 80 is introduced, and is operated by the introduced high temperature high pressure compressed air so as to generate a second power B for use in power demands.

For this function, an air turbine or turbo expander may be used for the power generating section 60. If it is able to generate power by the operation using compressed air, various means may be used for the power generating section 60 besides the aforementioned air turbine or turbo expander.

Figure 5:
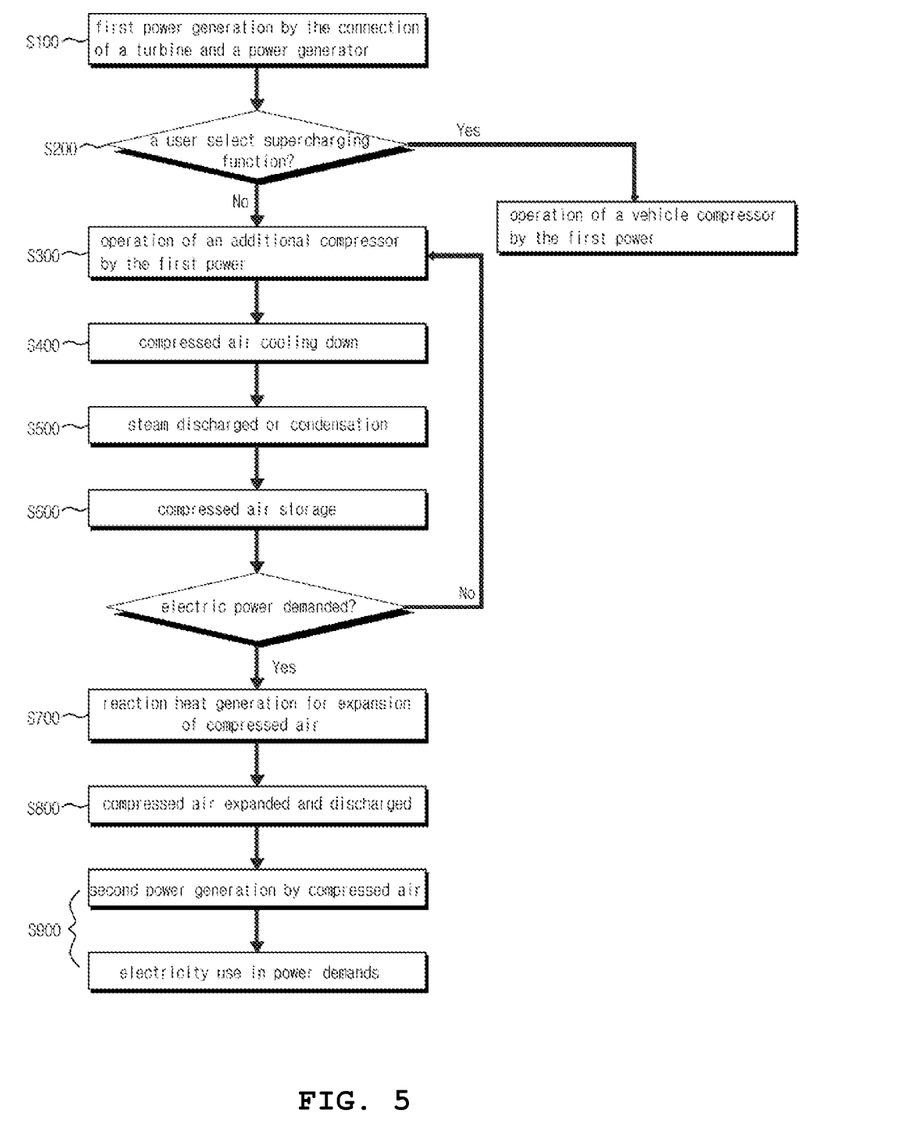
FIG. 5 is a flowchart showing the method of storing energy in an automotive vehicle by using compressed air energy storage according to the present invention.

Now hereinafter, an energy storage method using the energy storage for an automotive vehicle having the configuration and the structure described above according to an embodiment of the present invention will be described in detail.

1. A step of connecting the power generator 10 to the power of the turbine 12 in an automotive vehicle so as to generate a first power A (S100): As the step of generating electric power by connecting the power generator 10 to the shaft power drawn from the turbo charger (the turbine 12) upon the operation of the engine 11, more particularly, in the turbo charger configuration for supercharging of the engine 11, the turbine 12 of the automotive vehicle and the vehicle compressor 20, which are in connection with each other, are decoupled, and the power generator 10 is connected to the turbine 12 of the automotive vehicle so that the turbine 12 is rotated by the pressure of the exhaust gas introduced into the turbine 12 and the power generator 10 is driven by the rotation force so as to generate the first power A.

2. A step of driving the vehicle compressor 20 by the first power A so as to supply supercharging of the engine 11 (S200): the aforementioned first power A is supplied to the vehicle compressor 20 (the vehicle compressor 20 which is driven by electric power), which is decoupled from the turbine 12 in order to connect the power generator 10 to the turbine 12, so as to operate the vehicle compressor 20. If it is determined that the purpose of the supercharging is more important than the storage of electric power according to the necessity of a user, the electric power is supplied to the vehicle compressor 20, and the vehicle compressor 20 takes in outer air so as to press high temperature high pressure compressed air. The high temperature high pressure compressed air performs its original function of supercharging of the engine 11 (The high temperature high pressure compressed air is moved to the cooler 13 to be changed to low temperature high pressure compressed air, which is then supplied to the engine).

3. A step of driving the additional compressor 30 by the first power A or the third power C via the PV modules 90 (S300): As the step of using the first power A generated by the aforementioned S100 or the third power C generated via the PV modules 90, which are installed outside the automotive vehicle to generate electric power by using sunlight energy generation, when extra electric power is generated as above (the first power A generated from the power generator 10 driven by the discharge gas of the vehicle or the third power C generated via the PV modules 90 of the vehicle), either one of the first power A and the third power C is used to drive the additional compressor 30 besides the vehicle compressor 20.

That is, the additional compressor 30 can be driven by the first power A when the discharge gas is discharged during the time while the vehicle being driven, or can be driven by the third power C generated by using sunlight energy generation when the discharge gas is not discharged, that is, while the vehicle is stopped or parked.

The function of the additional compressor 30 is to draw in outer air, that is, the air around the unit or the vehicle, and change into high temperature high pressure compressed air.

4. A step of cooling the compressed air generated in the additional compressor 30 by using outer air (S400): As the step of effectively cooling down the heat of the compressed air pressurized with high temperature and high pressure in the aforementioned step S300, the high temperature high pressure compressed air through and from the additional compressor 30 goes to the heat exchanger 40. The high temperature high pressure compressed air, which is introduced into the heat exchanger 40, exchanges the heat with outer air, so that the high temperature high pressure compressed air is changed into low temperature high pressure compressed air, and the outer air is increased in its temperature and changed into high temperature outer air.

5. A step of storing the cooled compressed air (S500): The low temperature high pressure compressed air which has been cooled down in the aforementioned step S400 is stored in the storage tank 50. The low temperature high pressure compressed air stored in the storage tank 50 is discharged and used for the necessity of electric power in the case that the demand for various electric power usages is occurred in and out of the vehicle, that is, electric power which can be used inside the vehicle for its car lamp, etc. or home or outdoor uses such as lantern, etc.

6. A step of storing the heat energy of the outer air used for heat exchange (S600): The heat energy of the high temperature outer air, which is increased in its temperature by the heat exchange with the high temperature high pressure compressed air in the step S400, is stored in the heat storage section 70.

The high temperature outer air, which is introduced into the heat storage section 70 composed of the plurality of heat storage units 71, reacts with the storage material 72 placed inside the plurality of heat storage units 71. That is, the storage material 72 receives the heat energy of the high temperature outer air, and is separated into water and the storage material 72 (material in the solid state) having latent heat, which enable to release heat, so as to generate steam (Dehydration of storage material).

In this step, the storage material 72 stores the heat energy of the high temperature outer air thereinside, and the water is produced as steam.

7. A step of cooling the steam generated during the storage of the heat energy and storing as condensate water (S700): The separated water element from the storage material 72 (generated as steam) is moved to the steam processing section 80 via a separate discharge pipe, when the heat energy is stored in the heat storage section 70 in the step S600. That is, the steam discharged into the steam processing section 80 is cooled down and stored in the liquid state of condensate water.

8. A step of supplying the steam to the heat storage section 70 when electric power is demanded in and out of the automotive vehicle, so as to generate the heat energy stored in the heat storage section 70 (S800): On demand of electric power generated by using the compressed air stored in the storage tank 50, the compressed air in the storage tank 50 needs expanding for use, and thus, extra reaction heat needs to be supplied to expand the compressed air stored in the storage tank 50.

The condensate water stored in the condensate water tank 82 in the step S700 is heated by using the heating unit 83 so as to produce steam.

The steam is supplied to the storage material 72 of each of the heat storage units 71, which is in the state of latently releasing heat. The storage material 72 being able to release heat reacts with the steam inside the heat storage units 71 so as to generate heat. The produced heat energy is used for the reaction heat to expand the low temperature high pressure compressed air.

9. A step of supplying condensate water to the heat storage section 70 instead of the steam when the internal temperature of the heat storage section 70 reaches a predetermined set temperature (S900): The condensate water supplied from the condensate water tank 82 was heated and supplied as steam when there is no initial reaction heat in the storage material 72 in the heat storage units 71 as described above. After sufficient reaction heat is generated in the heat storage units 71 (or the storage material 72) for a predetermined time period by the supplied steam, the steam generation using the heating unit 83 is stopped.

The steam is not supplied by using the heating unit 83 after a predetermined time, but the condensate water inside the condensate water tank 82 is directly supplied to the heat storage section 70. Steam is continuously generated from the heat storage units 71 of the heat storage section 70, that is, by the reaction heat generated from the storage material 72 (heat energy generation stored in the storage material 72), and thus, the generated heat energy from the storage material 72 is used to expand the low temperature high pressure compressed air in the storage tank 50 so as to facilitate the continuous air expansion of low temperature high pressure compressed air.

10. A step of expanding the compressed air to be supplied as the heat energy (S1000): As in the step S900, the heat energy is generated by the steam supplied to the heat storage section 70, and the low temperature high pressure compressed air discharged from the storage tank 50 being moved to the later-mentioned power generating section 60 can be easily expanded by the heat energy.

11. A step of driving the power generating section 60 by the expanded compressed air so as to generate the second power B for use in electric power demands (S1100). The expanded high temperature high pressure compressed air through the step S1000 is supplied to the power generating section 60 to drive so that the electric power generated in the power generating section 60 is used in electric power demands.

While the invention is described above with reference to the finite embodiments and drawings, the invention is not limited to the embodiments but can be modified and changed in various forms by those skilled in the art without departing from the technical concept of the invention and the equivalents of the appended claims.

What is claimed is:

1. An adiabatic compressed air energy storage for an automotive vehicle comprising:
   a first power generator being connected to a turbine for generating a first electric power;
   a compressor being driven by the first electric power and supplying compressed air for turbo-charging of an automotive vehicle;
   a heat exchanger for cooling the compressed air by heat-exchanging the compressed air with ambient air for producing high temperature air;
   a storage tank for receiving and storing the cooled compressed air;
   a second power generator driven by the compressed air in the storage tank and generating a second electric power for use in electric power demand;
   a heat storage storing heat energy of the high temperature air discharged from the heat exchanger; and
   a steam processing unit storing steam discharged from a reaction of the high temperature air with a storage material in the heat storage and supplying the steam when demanded to generate the heat energy of the storage material.

2. The adiabatic compressed air energy storage according to claim 1, wherein the heat storage comprises a plurality of heat storage units having the storage material in solid state for storing the heat energy and discharging the stored heat energy.

3. The adiabatic compressed air energy storage according to claim 1, wherein the heat storage uses the heat energy stored therein to expand the compressed air in the storage tank to be supplied to the second power generator.

4. The adiabatic compressed air energy storage according to claim 1, wherein the steam processing unit comprises:
   a condensation unit condensing the steam generated in the heat storage;

a condensate water tank storing condensate water of the condensation unit; and a heating unit heating the condensate water in the condensate water tank and supplying steam to the heat storage.

5. The adiabatic compressed air energy storage according to claim 1, wherein the steam is required in the heat storage to enable the storage material storing the heat energy therein to generate the heat energy by an adsorption process of the storage material, the steam being supplied from the steam processing unit at initial reaction of the storage material, and once the storage material generates heat after a predetermined time, the steam being produced from an inside of the heat storage by receiving condensate water from a condensate water tank of the steam processing unit.

6. The adiabatic compressed air energy storage according to claim 1, wherein the second power generator generates the second electric power by using an air turbine or a turbo expander, and the produced second electric power is used in electric power demands inside and out of an automotive vehicle.

7. The adiabatic compressed air energy storage according to claim 1, wherein the compressor is driven by a third electric power generated via a photovoltaic (PV) module installed in an automotive vehicle.

8. The adiabatic compressed air energy storage according to claim 1, wherein a sensor is provided in each heat storage unit in the heat storage to sense a heat storage state, and a user monitors the sensor outside.

9. A method of storing energy using an adiabatic compressed air energy storage for an automotive vehicle, comprising:

connecting a first power generator to a turbine for generating a first electric power;

driving a vehicle compressor by the first electric power to supply supercharging to an engine;

driving an additional compressor by the first electric power or a third electric power via a photovoltaic (PV) module;

cooling a compressed air generated in the additional compressor by using ambient air to produce a cooled compressed air and a heated ambient air;

storing the cooled compressed air;

storing heat energy of the ambient air used for heat exchange;

cooling steam generated during the storage of the heat energy and storing as condensate water;

supplying the steam to a heat storage when electric power is demanded in and out of the automotive vehicle, so as to discharge the stored heat energy;

supplying the condensate water to the heat storage instead of the steam when an internal temperature of the heat storage reaches a predetermined set temperature;

expanding the compressed air to be supplied as heat energy; and driving a second power generator by the expanded compressed air so as to generate a second electric power for use in electric power demands.

* * * * *